UNITED STATES PATENT OFFICE 2,656,728

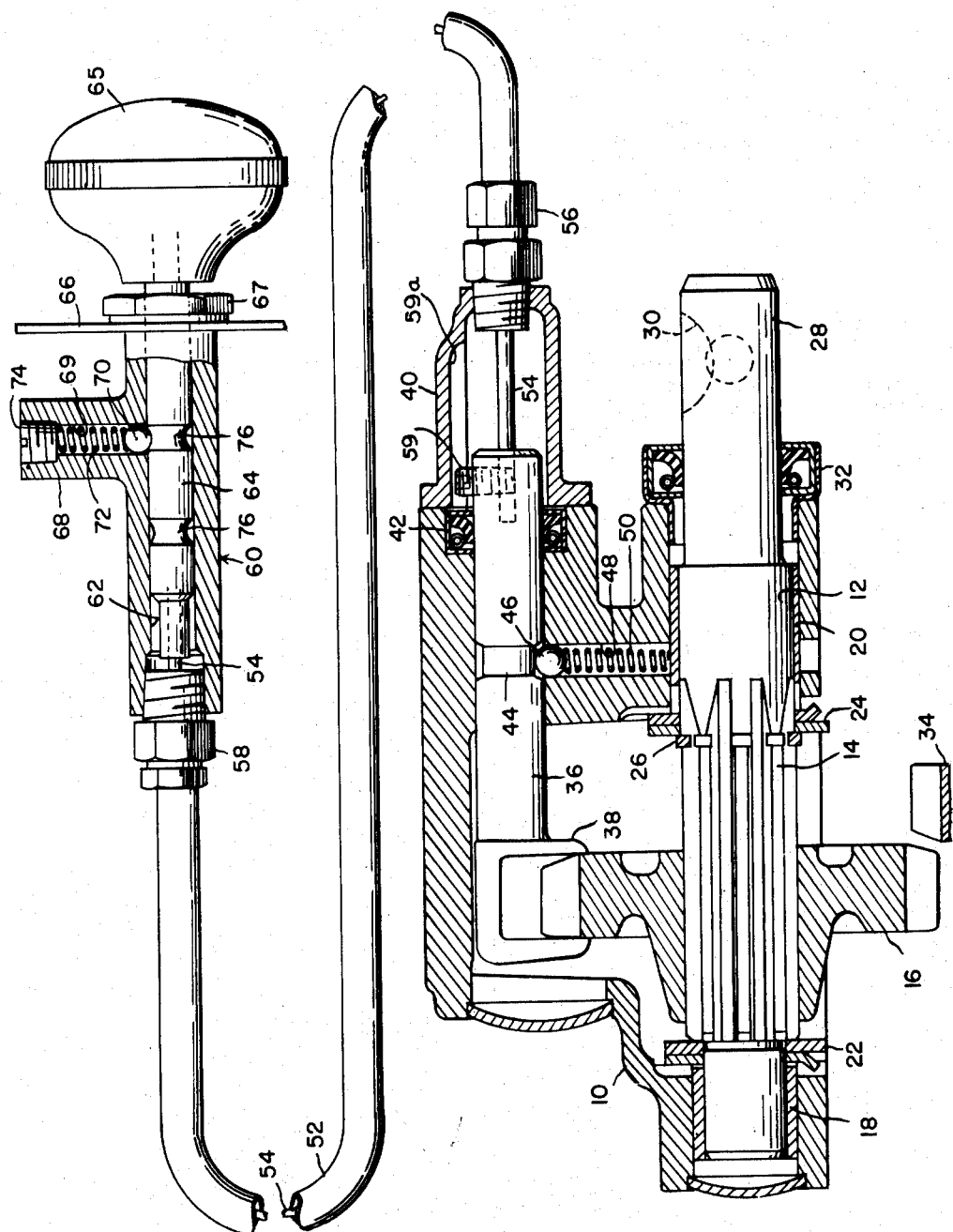

POWER TAKE-OFF ATTACHMENT FOR MOTOR VEHICLES

Louis W. Downey, Detroit, Mich., assignor to Detroit Harvester, Company, Detroit, Mich., a corporation of Michigan Application July 3, 1950, Serial No. 171,917

2 Claims. (Cl. 74—15.86)

The present invention relates to power take-off attachments for motor vehicles, and more particularly to power take-off attachments including a gear designed to be selectively meshed with a transmission gear of a motor vehicle such for example as a truck, tractor, or the like.

It is an object of the present invention to provide control means for selectively engaging a power take-off gear with a transmission gear which is operable from the instrument board of the motor vehicle.

More specifically, it is an object of the present invention to provide a power take-off attachment designed for remote control and characterized by the complete enclosure of all moving parts of the control, in order to avoid interference with the movement thereof by accumulation of dirt, ice, or the like.

More specifically, it is an object of the present invention to provide control means for a power take-off attachment comprising a flexible tube and wire device for selectively engaging the power take-off gear with a transmission gear in combination with locating means for the power take-off gear remote from the power take-off attachment, and designed to avoid subjecting the flexible tube and wire means to excessive forces, particularly in compression.

It is a further object of the present invention to provide in combination with a power take-off attachment a flexible tube and wire device for selectively engaging and disengaging a power take-off gear with a transmission gear in which the flexible tube and wire device includes a head mounted on the instrument panel or other convenient point in the vehicle, and in which locating means for the power take-off gear is provided in the head.

Still more specifically, it is a feature of the present invention to provide a flexible tube and wire device for selectively engaging a power take-off gear with a transmission gear which comprises an elongated head adapted to be mounted on the instrument panel or the like, of a motor vehicle, said head comprising a longitudinally slidable control member connected to the wire, said member having a plurality of longitudinally spaced recesses, in combination with a spring pressed detent selectively engageable with said recesses to determine the position of said power take-off gear, whereby the force necessary to displace the detent is not required to be transmitted through the flexible tube and wire device.

Other objects and features of the invention will become apparent as the description proceeds, especially when taken in conjunction with the accompanying drawings, wherein the figure is a transverse sectional view through the power take-off attachment and is a similar view partly in section through the control device therefor.

Referring now to the figure the power take-off attachment comprises a casing 10 in the form of a casting which may be of aluminum or the like, and which has journaled therein a power take-off shaft 12 provided with splines 14 on which is mounted the axially slidable power take-off gear 16. Bearings 18 and 20 are provided for the power take-off shaft and additional bearings indicated generally at 22 and 24 are provided for taking up end thrust on the shaft 12. The shaft is retained in position in the casing 10 by a snap ring 26.

One end of the power take-off shaft 12 extends beyond the casing as indicated at 28 and has a keyway 30 therein for connection to means to be driven thereby. An oil seal 32 is provided in the opening in the casing through which the end 28 of the power take-off shaft 12 extends.

In use, the power take-off gear 16 is axially slidable on the splines 14 between the position shown in the figure, which is the neutral position, and a position to the right thereof, in which position the power take-off gear 16 is in mesh with a gear 34 of the vehicle transmission.

In order to selectively engage the power take-off gear 16 with the transmission gear 34, a shifter shaft 36 is provided in the casing having a fork portion 38 engageable with opposite sides of the power take-off gear 16. The shifter shaft 36 extends laterally through an opening in the casting and into a removable cap 40 which in the assembled article constitutes a portion of the casing 10. An oil seal 42 is provided at the point where the shifter shaft 36 extends outwardly through an opening in the casting.

The shifter shaft 36 is provided with a recess 44 which as illustrated may comprise a circumferential groove. The recess 44 is designed as a safety device to locate and retain the shifter shaft in a position corresponding to neutral position of the power take-off gear 16. For this purpose it is designed to receive a spring pressed detent in the form of a ball 46 received within a bore 48 in the casting which receives a compression spring 50. As illustrated in the figure, one end of the compression spring 50 seats against the bearings 20. It will be observed that the recess 44 is of greater axial extent than the ball 46 so that the ball 46 does not serve to locate the shifter shaft in precisely predetermined position, this function being performed by additional means later to be described. The spring pressed detent 46 and the recess 44 operate as a safety device to prevent accidental engagement of the power take-off gear with the transmission gear in the event of failure of the other locating means.

The means for moving the shifter shaft 36 longitudinally comprises a flexible tube and wire device made up of a flexible tube 52 and a flexible wire 54. The removable cap 40 includes clamping means 56 for receiving one end of the tube 52, and the other end of the tube 52 is clamped within similar clamping means 58. One end of wire 54 is received in a recess at the end of shaft 36, and clamped in place by a set screw 59, the head of which is slidable in a slot 59a formed within cap 40, thereby retaining the shaft 36 against rotation.

Means for actuating the flexible wire 54 includes a head 60 which has the general form of an elongated tubular member having an internal bore 62. One end of the wire 54 is received within a recess in a longitudinally slidable control member 64 mounted in the head 60 and retained therein by suitable means such for example as a set screw (not shown). The opposite end of the control member 64 is provided with a knob 65 for manual manipulation by the operator, and the head is attached to the instrument panel 66 by suitable means such for example as the clamping nut 67. The head 60 has a laterally extending arm 68 having an internal bore 69 adapted to receive a spring pressed detent in the form of a ball 70. A compression spring 72 is located in the bore and seats at its outer end against a threaded plug 74.

In order to accurately predetermine the position of the power take-off gear 16, the control member 64 is provided with a plurality of recesses 76 which as illustrated in the figure, comprise circumferentially extending grooves of a shape adapted to conform to the periphery of the ball 70. Thus, the ball 70 is effective to accurately predetermine the position of the control member 68.

In the illustrated embodiment of the invention the power take-off gear 16 is designed to be retained in one of two positions, either a neutral position in which it is clear of the transmission gear 34 or an operating position in which it is meshed with the gear 34. However, it will be appreciated that the present invention is equally applicable to power take-off arrangements in which the power take-off gear is selectively engageable with one or another of two transmission gears rotatable in opposite directions so that the power take-off shaft may likewise be selectively driven in two directions. Also, the present invention is applicable to more complicated power take-off devices in which a plurality of gears are selectively positioned.

An important advantage of the present construction is that all of the moving elements of the control mechanism for a power take-off gear are fully housed. The power take-off attachment is normally exposed to the weather and in the past difficulty was encountered due to accumulation of ice, dirt, or the like, on exposed movable elements of the control mechanism. The problem of completely housing the movable elements of the control mechanism when a flexible tube and wire device is employed is complicated by the fact that flexible tube and wire devices available for the purpose of effecting control of a power take-off mechanism are not capable of transmitting relatively large forces. This is particularly true where the force to be transmitted through the flexible tube and wire device is the result of movement resulting in compressing force, as opposed to tension, on the wire. Flexible tubes employed in devices of this sort normally include a helically wound metallic element which is effective to withstand relatively great forces resulting from tension on the wire, since these forces in turn apply compressive force between adjacent convolutions of the metal member. However, when the force to be transmitted results from a compressive force applied on the wire, the tendency is to elongate the tube.

It will be readily apparent that the forces which must be overcome in selectively engaging and disengaging the power take-off gear with its transmission gear are in the first place friction between the transmission gear and the power take-off gear, and in the second place, forces developed by the spring pressed detents used to effect accurate location of the power take-off gear.

In the present construction the spring pressed locating means comprising the ball 70 and the recesses 76 are located in the head 60. Thus the forces necessary to displace the ball 70 from the recesses 76 are applied directly between the knob 65, control member 64, and head 60, so that none of these forces are required to be transmitted through the flexible tube and wire. Moreover, it will be observed that the recess 44 on the shifter shaft 36 is located such that the forces necessary to displace the ball 46 are required only at a time when the power take-off gear 16 is out of mesh with the gear 34. In other words, at no time is a force required to be transmitted through the flexible tube and wire to overcome the combined frictional resistance between the gears, and to displace the ball 46. Moreover, the ball 46 and recess 44 are in the nature of a safety device and may if desired be omitted, in which case the spring pressed locating means are all located in the head 60 so that forces to overcome spring pressed locating means are not transmitted through the flexible tube and wire.

Prior to the present invention relatively complicated leverage was employed on the power take-off attachment to obtain the necessary mechanical advantage to overcome the resistance of spring pressed locating means, where forces were transmitted through a flexible tube and wire. The levers for this purpose were exposed to accumulations of dirt, ice, and the like, which resulted in inability to operate the mechanism. Alternatively, relatively complicated mechanism has been employed in the power take-off attachment so that the resistance of the spring pressed locating means in the power take-off attachment and the frictional resistance to movement of the power take-off gear were overcome sequentially. The present invention renders these expedients unnecessary and results in a simplified and more efficient arrangement. By providing the spring pressed locating means in the head at the manually operated end of the flexible tube and wire device, it becomes necessary only to transmit forces through the device sufficient to overcome frictional resistance to movement of the power take-off gear. It is found that these forces are well within the capacity of available flexible tube and wire devices. Attention is directed to the fact that with the specific arrangement illustrated in the figure, the force necessary to move the power take-off gear 16 from the position shown into meshed engagement with the transmission gear 34, which force must initially overcome the resistance of the spring pressed detent 46, is transmitted through the flexible wire and tube device as a result of a pull on the knob 65, thus subjecting the wire 54 to tension and the tube 52 to compressive forces which it is well adapted to resist. However, the recess 44 and spring pressed detent 46, being in the nature of a safety device and not essential to the operation of the power take-off attachment, may, as suggested above, be omitted if desired.

The drawing and the foregoing specification constitute a description of the improved power take-off attachments for motor vehicles in such full, clear, concise and exact terms as to enable any person skilled in the art to practice the invention, the scope of which is indicated by the appended claims.

What I claim as my invention is:

1. A power take-off attachment for a motor vehicle comprising a casing attachable to the transmission housing of the vehicle, a power take-off shaft journaled within said casing, and projecting at one end therebeyond, a power take-off gear splined on said shaft within said casing and shiftable axially thereon between a first position in which it meshes with a transmission gear of the vehicle and a second position in which it is out of mesh with the transmission gear, a shifter shaft parallel to said power take-off shaft, a shifter fork on said shifter shaft within said casing and engageable with opposite sides of said power take-off gear, said shifter shaft being mounted in said casing for longitudinal sliding movement, and means for effecting axial sliding movement of said shifter shaft comprising a flexible wire and tube device, a head for said device remote from said casing, the tube being fixed at opposite ends to said casing and to said head, a control member slidable longitudinally in said head having a knob for manual manipulation, the wire of said device being fixed at opposite ends directly to said shifter shaft and to said control member, said control member having a pair of longitudinally spaced locating recesses corresponding to engaged and disengaged positions of said gear, a locating spring pressed detent in said head cooperating with said locating recesses, a single recess on said shifter shaft, a spring pressed detent in said casing cooperating with said last mentioned recess, said last mentioned recess and detent being located for engagement when said gear is in disengaged position and being dimensioned to provide limited movement of said shifter shaft when engaged so that the exact position of said gear is determined by the detent and appropriate recess in said head.

2. Structure as defined in claim 1 in which said wire is connected to said shifter shaft so as to require tensioning of said wire to disengage the detent and recess in said casing to move said gear to engaged position.

LOUIS W. DOWNEY.

References Cited in the file of this patent

UNITED STATES PATENTS

| Number | Name | Date |
|---|---|---|
| 1,575,826 | Goetz | Mar. 9, 1926 |
| 1,860,246 | Horste | May 24, 1932 |
| 2,030,672 | Winning | Feb. 11, 1936 |
| 2,034,335 | Fisher | Mar. 17, 1936 |
| 2,100,677 | Wagner | Nov. 30, 1937 |
| 2,578,867 | Wagner | Mar. 18, 1951 |

FOREIGN PATENTS

| Number | Country | Date |
|---|---|---|
| 570,440 | Great Britain | July 6, 1945 |